March 11, 1947. R. E. EGGERT 2,417,243

SHEET METAL NUT

Filed Jan. 1, 1945 2 Sheets-Sheet 1

Inventor
RONALD EDGAR EGGERT
By R. S. Berry
Attorney

March 11, 1947. R. E. EGGERT 2,417,243
SHEET METAL NUT
Filed Jan. 1, 1945 2 Sheets-Sheet 2
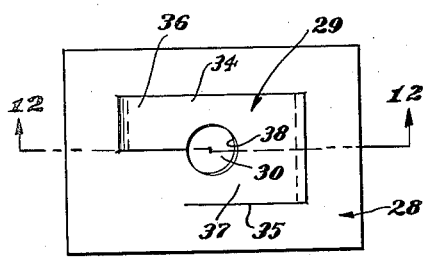
Fig. 7.
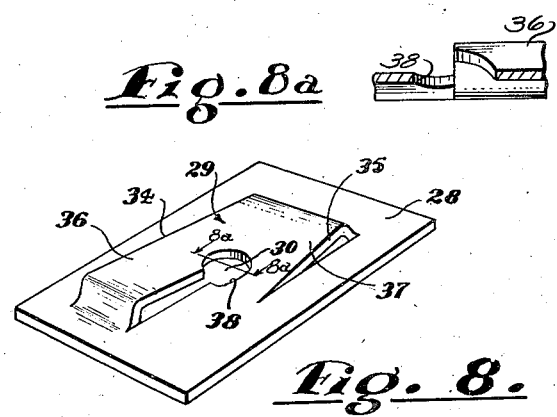
Fig. 8a.
Fig. 8.
Fig. 9.
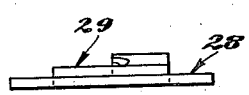
Fig. 10.
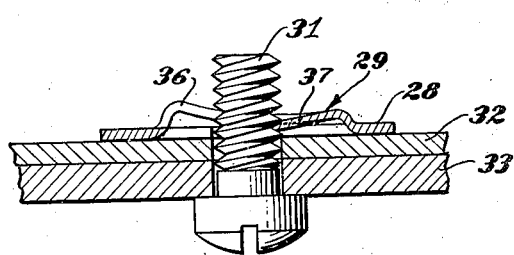
Fig. 12.
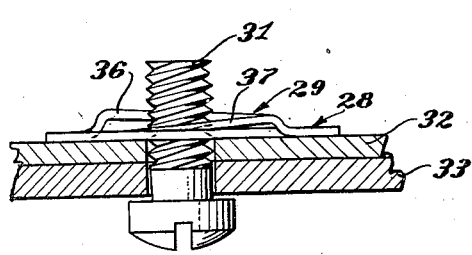
Fig. 11.
Inventor
RONALD EDGAR EGGERT
By R. S. Berry
Attorney Patented Mar. 11, 1947

2,417,243

UNITED STATES PATENT OFFICE 2,417,243

SHEET METAL NUT

Ronald Edgar Eggert, Burbank, Calif., assignor to Adel Precision Products Corp., a corporation of California Application January 1, 1945, Serial No. 570,956

4 Claims. (Cl. 85—36)

This invention relates to sheet metal self-locking nuts of the type in which a sheet metal body is formed with outwardly offset resilient portions lying side by side for threadedly engaging a screw threaded member turned between such portions.

A nut of this type forms the subject matter of my application for Patent Serial Number 553,640, filed September 11, 1944, and the present invention has for its primary object the provision of a nut of the character described which embodies improvements over nuts of this type as heretofore made, as follows:

1. The formation of a helically pitched thread-engaging resilient edge portion in the two bridge portions of the nut with a lesser amount of distortion, severing and punching out of the material of the nut than heretofore required, thereby making for a stronger and more rigid nut while providing an adequate yielding or resilient action to assure a tensioned, threaded and locking engagement of said edge portions with a screw threaded fastening.

2. The provision of an almost circular, helically pitched edge portion with only one small break or interruption in said edge portion instead of the two interruptions which are provided where complementary arcuate edge portions are arranged to grip the threaded fastenings, thereby providing a better thread lead in the nut and assuring a more reliable and easier threading of the nut onto the fastening without jamming and consequent damage of the threads thereof or of the thread-engaging edge of the two bridge portions.

3. A simplification and reduction of the cost of the stamping operation and stamping equipment required for making the nut compared to operations and equipment heretofore employed.

4. The provision for repeated use of the nut with a proper and reliable threading and self-locking action thereof with each use, due to the fact that the bridge portion and the nearly circular helically pitched threading edge portion are constructed and arranged to prevent such permanent distortion of said bridge portion and said edge as would interfere with the desired threading and self-locking action of the nut.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 7 is a top plan view of a modified form of nut embodying this invention;

Fig. 8 is a perspective view of the nut shown in Fig. 7;

Fig. 8a is an enlarged sectional detail on line 8a—8a of Fig. 8;

Fig. 9 is a side elevation of the modified form of nut shown in Figs. 7 and 8;

Fig. 10 is an end elevation of the modified form of nut;

Fig. 11 is a side elevation of the modified nut as applied and before being tightened;

Fig. 12 is a sectional view taken on the line 12—12 of Fig. 7 showing the nut applied and tightened.

As shown in Figs. 1 to 6 inclusive of the accompanying drawing one form of nut embodying my invention is made from a preferably elongated plate-like piece of resilient sheet metal stamped to provide a rectangular frame-like body 14 and an elongated outwardly offset mid-portion 15 surrounded by and integral at its ends with the frame-like body.

Figure 1:
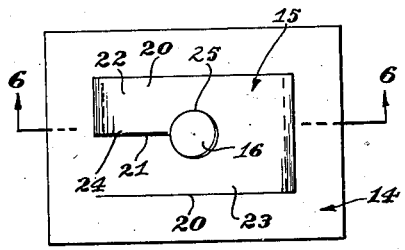
Fig. 1 is a top plan view of a nut made in accordance with the invention.
Figure 2:
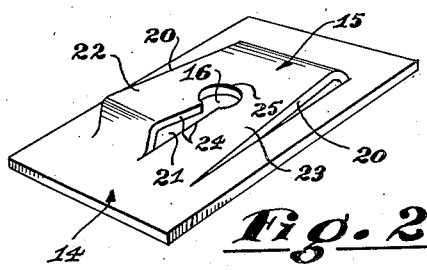
Fig. 2 is a perspective view of the nut hereof.
Figure 3:
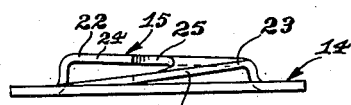
Fig. 3 is a side elevation of the nut.
Figure 4:
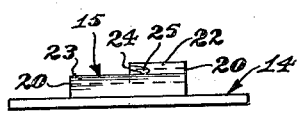
Fig. 4 is an end elevation of the nut.
Figure 5:
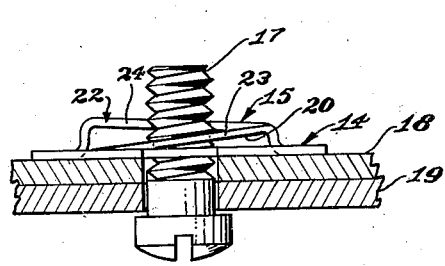
Fig. 5 is a side elevation of the nut as applied and before being tightened.
Figure 6:
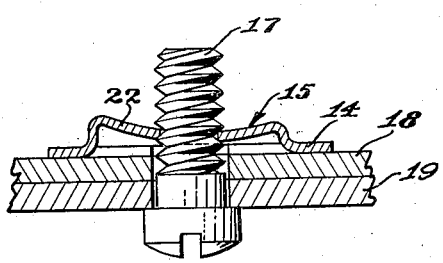
Fig. 6 is a longitudinal sectional view of the nut as applied and tightened, being taken on the line 6—6 of Fig. 1.

Centrally of the offset portion 15 a circular opening 16 is formed for threaded reception of a threaded fastening such as the screw 17 whereby as shown in Figs. 5 and 6, members 18 and 19 may be secured to another by means of the screw and the nut hereof.

In stamping out the portion 15 the material of the body is severed longitudinally substantially the full length of said portion along the outer longitudinal edges 20 thereof but is cut or severed as at 21 along its longitudinal medial line from one side only of the opening 16 to one end of portion 15, thereby dividing approximately one-half of the portion 15 so as to define side-by-side bridge portions 22 and 23 which are resilient and relatively yieldable. Thus it is seen the portion 15 as a whole is formed as a bridge half of which is divided to form the two side-by-side bridge portions 22 and 23.

In stamping out the portions 22 and 23 they are oppositely inclined, that is, the offset portion 15 considering it as divided along its medial longitudinal line, is formed so that one longitudinal "half" thereof including the bridge portion 22 is outwardly offset a greater extent than the other "half" including portion 23, and is inclined in the opposite direction to the inclination of said other half. This arrangement spaces the opposed edges 24 of the bridge portions 22 and 23 and provides for a helically pitched almost circular edge portion 25 around the opening 16. This edge portion has but one small interruption or break where the cut or slit 21 intersects said edge, being uninterrupted at the side of said opening farthest from said slit, and therefore will readily and easily come into threaded engagement with the threads of the screw threaded fastening 17 much more satisfactorily and without burring or damaging the threads or being itself burred or damaged as compared to threading edges formed of two opposed and arcuate edge portions spaced from one another as shown in my former application hereinbefore identified.

When the nut and screw engaged as shown in Fig. 5 are tightened, the offset portion 15 as a whole will yield and bow inwardly as shown in Fig. 6, while the separate bridge portions 22 and 23 are subject to relative yielding and inward bowing with the result that the nearly circular edge 25 is yieldingly distorted so as to wedge and bite between the screw threads of the screw thereby locking the nut and screw against loosening as shown in Fig. 6.

It should be noted that compared to nuts as heretofore made, less of the material of the nut is severed by reason of the slit or cut 21 extending from but one side of the opening 16 to one end of the offset portion 15, thereby making for a stronger and more rigid nut but not depriving the nut of the yielding action desirable for effecting a locking of the edge 25 against the screw.

A modified form of my invention as shown in Figs. 7 to 12 inclusive, is of substantially the same construction as the nut shown in Fig. 1 to 6 except that a still smaller area of the nut is distorted and less of the nut material is severed and stamped out than is the case with the first described form of my invention. This modified form is made from a single elongated piece of resilient sheet metal stamped so as to provide a rectangular frame-like body portion 28 surrounding an outwardly offset elongated portion 29 having a central circular opening 30 for reception of a screw 31 whereby two members 32 and 33 may be secured together by means of said screw and the nut hereof as shown in Figs. 11 and 12.

In striking out the portion 29 the material of the nut is severed along the full length of said portion on one side edge 34 thereof while on the other side of said portion the material is severed for an extent of but approximately one-half the length of portion 29 thereby providing a short side edge 35 which extends but part way of the length of portion 29. Along its longitudinal medial line the portion 29 is severed from one end thereof to the opening 30 and is stamped or formed so that the longitudinal "half" thereof lying between said medial line and the side edge 34 is inclined throughout its length and for the most part outwardly offset a greater extent than the other longitudinal "half" of said portion 29, thereby defining a resilient arch or bridge portion 36.

Only that part of the other longitudinal "half" of offset portion 29 lying between the short edge 35 and the longitudinal medial line of portion 29 need be offset from the body portion 28 and inclined in the opposite direction to the bridge portion 36, thereby defining a second bridge or arch portion 37. The opening 30 is formed in the contiguous oppositely inclined and relatively offset portions of the bridge portions 36 and 37 in the same manner as in Figs. 1 to 6 so that there is provided a helically pitched threading edge 38 corresponding to edge 25, for screw threaded engagement with the screw 31.

In the use of this modified form of my invention as shown in Figs. 11 and 12, the two bridge portions 36 and 37 will yield and bow inwardly upon tightening the nut and screw thus locking the nut on the screw in the same manner as hereinbefore described in connection with the nut shown in Figs. 1 to 6 inclusive.

It is now apparent that in the modified form of my invention shown in Figs. 7 to 12 inclusive less severing and distortion of the metal is required than in the first described form yet sufficient yielding is afforded to assure the desired threading and self-locking action of the nut.

While I have shown and described specific embodiments of the invention I do not limit myself to the exact details of construction set forth, and the invention embraces such changes, modifications and equivalents of the parts and their formation and arrangement as come within the purview of the appended claims.

I claim:

1. In a lock nut, a resilient sheet metal body portion, and an elongated resilient bridge portion integral therewith and for the most part outwardly offset therefrom and provided with a circular opening for reception of a screw threaded fastening, said bridge portion being severed longitudinally between its side edges from one end thereof so as to intersect one side only of said opening and being relatively inclined and distorted so that the marginal portion thereof around said opening is helically pitched for a screw threaded engagement with a screw threaded fastening turned in said opening, said bridge portion being in integral formation with said body portion along a part of one side edge of the bridge portion as well as at both ends thereof.

2. In a lock nut, a resilient sheet metal body portion, and an elongated resilient bridge portion integral therewith and for the most part outwardly offset therefrom and provided with a circular opening for reception of a screw threaded fastening, said bridge portion being severed longitudinally between its side edges from one end thereof so as to intersect one side only of said opening and being longitudinally inclined from one end thereof to the other between a longitudinal line continued from said severance line through the center of said opening, and one longitudinal side edge of said bridge portion, and being also outwardly offset a greater extent than the remainder of said bridge portion, only a part of said remainder of said bridge portion lying between the other end of the bridge portion and said opening and between said longitudinal line, and the other side of the bridge portion being inclined whereby the marginal portion of said bridge portion around said opening is helically pitched for a screw threaded engagement with a threaded fastening turned in said opening.

3. In a lock nut, a resilient elongated sheet metal body portion, and an elongated resilient bridge portion integral at its ends with and being for the most part outwardly offset from said body portion, said bridge portion having an opening therein for reception of a screw or bolt, and being divided longitudinally from one end thereof up to said opening so that the dividing line extends through one side only of the opening, one of the longitudinally divided portions of said bridge portion being offset outwardly a greater extent than the other parts of the bridge portions which are contiguous and form the margin of said opening being helically pitched for a screw threaded engagement with said screw or bolt, said bridge portion having one longitudinal outer edge extending the full length thereof and its other outer edge extending approximately half the length of the first named outer edge.

4. In a lock nut, a resilient elongated sheet metal body portion, and an elongated resilient bridge portion integral at its ends with and being for the most part outwardly offset from said body portion, said bridge portion having an opening therein for reception of a screw or bolt, and being divided longitudinally from one end thereof up to said opening so that the dividing line extends through one side only of the opening, one longitudinal half of the bridge portion being inclined from one end of the bridge portion to the other and outwardly offset from the other longitudinal half thereof, only that part of said other half between said opening and one end of the bridge portion being inclined; that portion of the bridge portion forming the margin of said opening being helically pitched by reason of said inclinations and relative offsetting of said bridge portions, whereby a bolt or screw may be threadedly engaged therewith.

RONALD EDGAR EGGERT.

REFERENCES CITED

The following references are of record in the file of this patent:

UNITED STATES PATENTS

| Number | Name | Date |
|---|---|---|
| 2,117,775 | Tinnerman | May 17, 1938 |
| 2,379,892 | Eggert | July 10, 1945 |